(12) United States Patent
Kim et al.

(10) Patent No.: US 7,145,620 B2
(45) Date of Patent: Dec. 5, 2006

(54) THIN FILM TRANSISTOR ARRAY PANEL FOR LIQUID CRYSTAL DISPLAY HAVING PIXEL ELECTRODE

(75) Inventors: Dong-Gyu Kim, Yongin (KR); Hyang-Shik Kong, Suwon (KR); Jang-Soo Kim, Suwon (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 10/317,591

(22) Filed: Dec. 12, 2002

(65) Prior Publication Data
US 2003/0223019 A1 Dec. 4, 2003

(30) Foreign Application Priority Data
Jun. 3, 2002 (KR) .................. 10-2002-0031098

(51) Int. Cl.
G02F 1/1343 (2006.01)
G02F 1/136 (2006.01)

(52) U.S. Cl. .................. 349/139; 349/38; 349/43; 349/143; 345/103

(58) Field of Classification Search .................. 349/43, 349/139, 138, 146, 38, 143; 345/103
See application file for complete search history.

(56) References Cited

U.S. PATENT DOCUMENTS

| | | | | |
|---|---|---|---|---|
| 5,157,470 A * | 10/1992 | Matsuzaki et al. | ............ | 257/59 |
| 5,668,379 A * | 9/1997 | Ono et al. | ............ | 257/59 |
| 5,859,683 A * | 1/1999 | Tagusa et al. | ............ | 349/138 |
| 6,429,907 B1 * | 8/2002 | Park et al. | ............ | 349/38 |
| 6,507,375 B1 * | 1/2003 | Kawahata | ............ | 349/38 |
| 6,580,473 B1 * | 6/2003 | Kim | ............ | 349/38 |
| 6,639,640 B1 * | 10/2003 | Matsuoka et al. | ............ | 349/139 |
| 6,661,477 B1 * | 12/2003 | Yeo et al. | ............ | 349/43 |
| 2001/0052953 A1 * | 12/2001 | Tanaka | ............ | 349/43 |
| 2002/0008792 A1 * | 1/2002 | Chung et al. | ............ | 349/38 |

* cited by examiner

Primary Examiner—Huyen Ngo
(74) Attorney, Agent, or Firm—F. Chau & Associates LLC

(57) ABSTRACT

A TFT array panel includes an insulating substrate, a gate line and a storage electrode line formed thereon. The gate line and the storage electrode line are covered with a gate insulating layer, and a semiconductor island is formed on the gate insulating layer. A pair of ohmic contacts are formed on the semiconductor island, and a data line and a drain electrode are formed thereon. The data line and the drain electrode are covered with a passivation layer having a contact hole exposing the drain electrode. A pixel electrode is formed on the passivation layer and connected to the drain electrode through the contact hole. The TFT array panel is covered with an alignment layer rubbed approximately in a direction from the upper left corner to the lower right corner of the TFT array panel or the pixel electrode. The pixel electrode has approximately a rectangular shape and overlaps the gate line and the data line. The pixel electrode has an expansion located near the upper left corner of the pixel electrode to increase the width of the corresponding overlapping area between the pixel electrode and the gate line and/or the data line.

12 Claims, 5 Drawing Sheets

THIN FILM TRANSISTOR ARRAY PANEL FOR LIQUID CRYSTAL DISPLAY HAVING PIXEL ELECTRODE

BACKGROUND OF THE INVENTION (a) Field of the Invention

The present invention relates to a thin film transistor array panel for a liquid crystal display including a pixel electrode.

(b) Description of the Related Art

A liquid crystal display ("LCD") is one of the most widely used flat panel displays. An LCD includes two panels having field-generating electrodes and a liquid crystal layer interposed therebetween and controls the transmittance of light passing through the liquid crystal layer by realigning liquid crystal molecules in the liquid crystal layer with voltages applied to the electrodes.

One of the most commonly used LCDs provides a plurality of planar field-generating electrodes on one panel with switching elements switching the voltages applied to the electrodes and one large planar field-generating electrode on the other panel, which is applied with a fixed voltage or two swinging voltages. Thin film transistors ("TFTs") are usually used as the switching elements, and the panel including the TFTs is called the "TFT array panel."

The planar field-generating electrodes provided on respective panels generate electric field perpendicular to the panels. Some of the electric field lose that perpendicularity near the edges of the electrodes.

A typical LCD further includes an alignment layer for determining initial alignments of the liquid crystal molecules. One type of the alignment layer forces the director of the liquid crystal material to be parallel to the surface of the alignment layer (which is called homogeneous alignment), while another type forces the director to be normal to the surface (which is called hemeotropic alignment). A proper surface treatment of the alignment layer such as rubbing and light exposure controls the tilt directions of the liquid crystal molecules. For example, the rubbing in a direction enforces the major axes of the liquid crystal molecules to tilt in that direction.

The combination of the irregularity of the electric field near the edges of the field-generating electrodes and the compulsive alignment of the liquid crystal molecules using the surface treatment of the alignment layer may result in loss of control for the liquid crystal molecules. This effect is called disclination, which causes light leakage.

SUMMARY OF THE INVENTION

A thin film transistor array panel for a liquid crystal display is provided, which includes: a substrate; a plurality of signal lines provided on the substrate and including a gate line and a data line insulated from each other; a switching element electrically connected to the gate line and the data line; a pixel electrode electrically connected to the switching element and overlapping at least one of the signal lines via an insulator to form at least one overlapping area; and a rubbed alignment layer covering the pixel electrode, wherein at least one portion of the at least one overlapping area near a starting position of rubbing of the alignment layer is wider than other portions of the at least one overlapping area.

According to an embodiment of the present invention, the pixel electrode has an expansion forming the at least one portion of the at least one overlapping area.

According to another embodiment of the present invention, the pixel electrode has a plurality of major edges, and at least one of the major edges proceeds into the at least one of the gate line and the data line more deeply than other major edges to form the at least one portion of the at least one overlapping area.

The switching element preferably includes a semiconductor layer electrically connected to the gate line and the pixel electrode, and the semiconductor layer extends along the data line. The switching element further includes an ohmic contact interposed between the semiconductor layer and the data line.

According to an embodiment of the present invention, the thin film transistor array panel further includes: a storage electrode separated from the signal lines; and a storage conductor electrically connected to the pixel electrode and overlapping the storage electrode via an insulating layer. The storage conductor is directly connected to the thin film transistor.

It is preferable that the pixel electrode is located on the insulator, and the thin film transistor is located under the insulator.

Another thin film transistor array panel for a liquid crystal display is provided, which includes: a substrate; a plurality of signal lines provided on the substrate and including a gate line and a data line; a gate insulating layer interposed between the gate line and the data line; a switching element electrically connected to the gate line and the data line; a pixel electrode electrically connected to the switching element; and a passivation layer interposed between the pixel electrode and the data line and between the pixel electrode and the gate line, wherein the pixel electrode overlaps at least one of the signal lines to form at least one overlapping area and includes an expansion providing larger width of a portion of the at least one overlapping area than other portions of the at least one overlapping area.

The at least one of the signal lines preferably includes the gate line.

According to an embodiment of the present invention, the pixel electrode has substantially a rectangular shape with four major edges including first two major edges substantially parallel to the gate line and second two major edges substantially parallel to the data line, and a portion of the first two major edges form the expansion.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or the similar components, wherein.

DETAILED DESCRIPTION OF PREFERRED EMBODIMENTS

Figure 1:
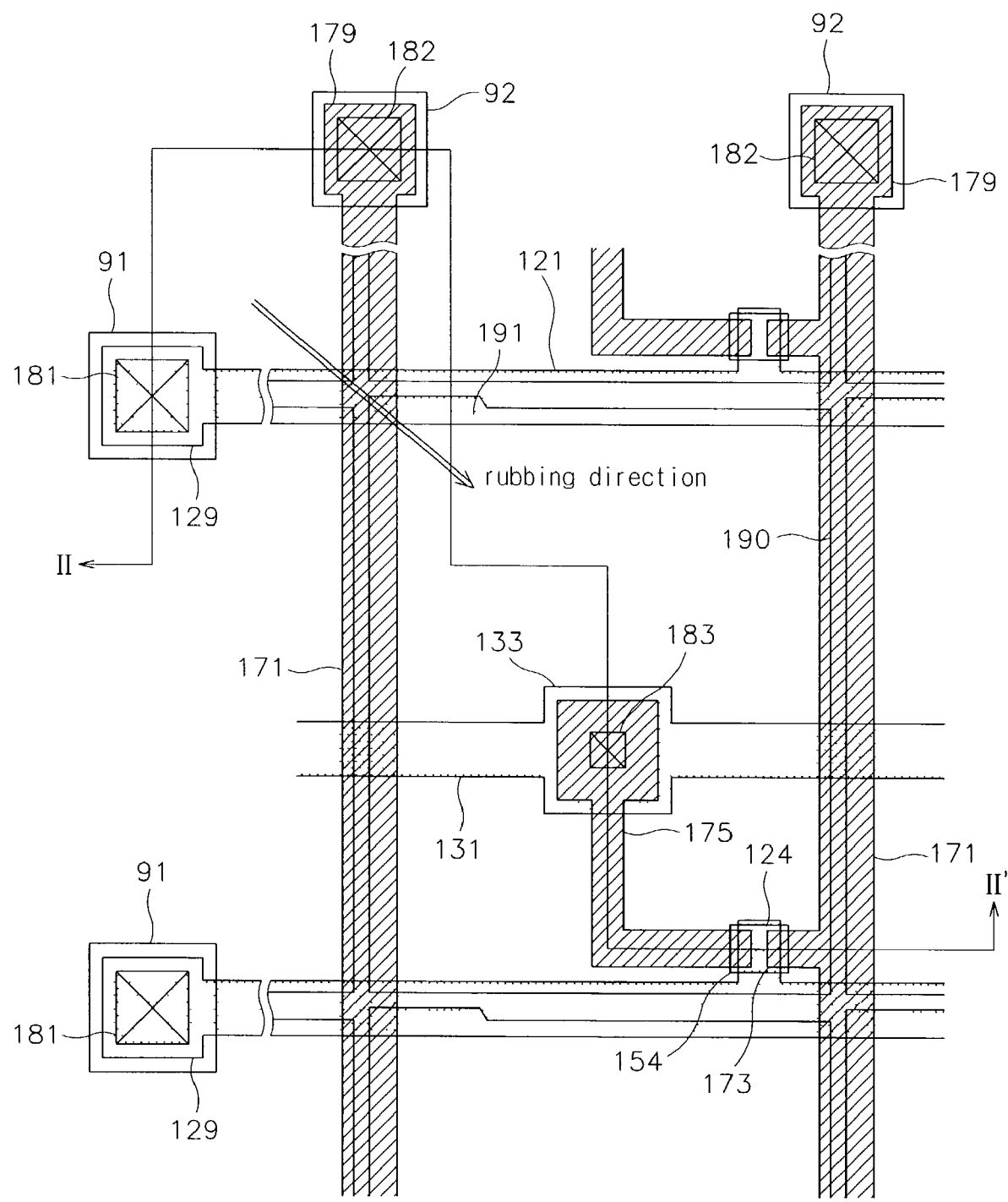
FIG. 1 is a layout view of an exemplary TFT array panel for an LCD according to an embodiment of the present invention.

The present invention now will be described more fully hereinafter with reference to the accompanying drawings, in which preferred embodiments of the invention are shown.

In the drawings, the thickness of layers and regions are exaggerated for clarity. Like numerals refer to like elements throughout. It will be understood that when an element such as a layer, region or substrate is referred to as being "on" another element, it can be directly on the other element or intervening elements may also be present. In contrast, when an element is referred to as being "directly on" another element, there are no intervening elements present.

Figure 2:
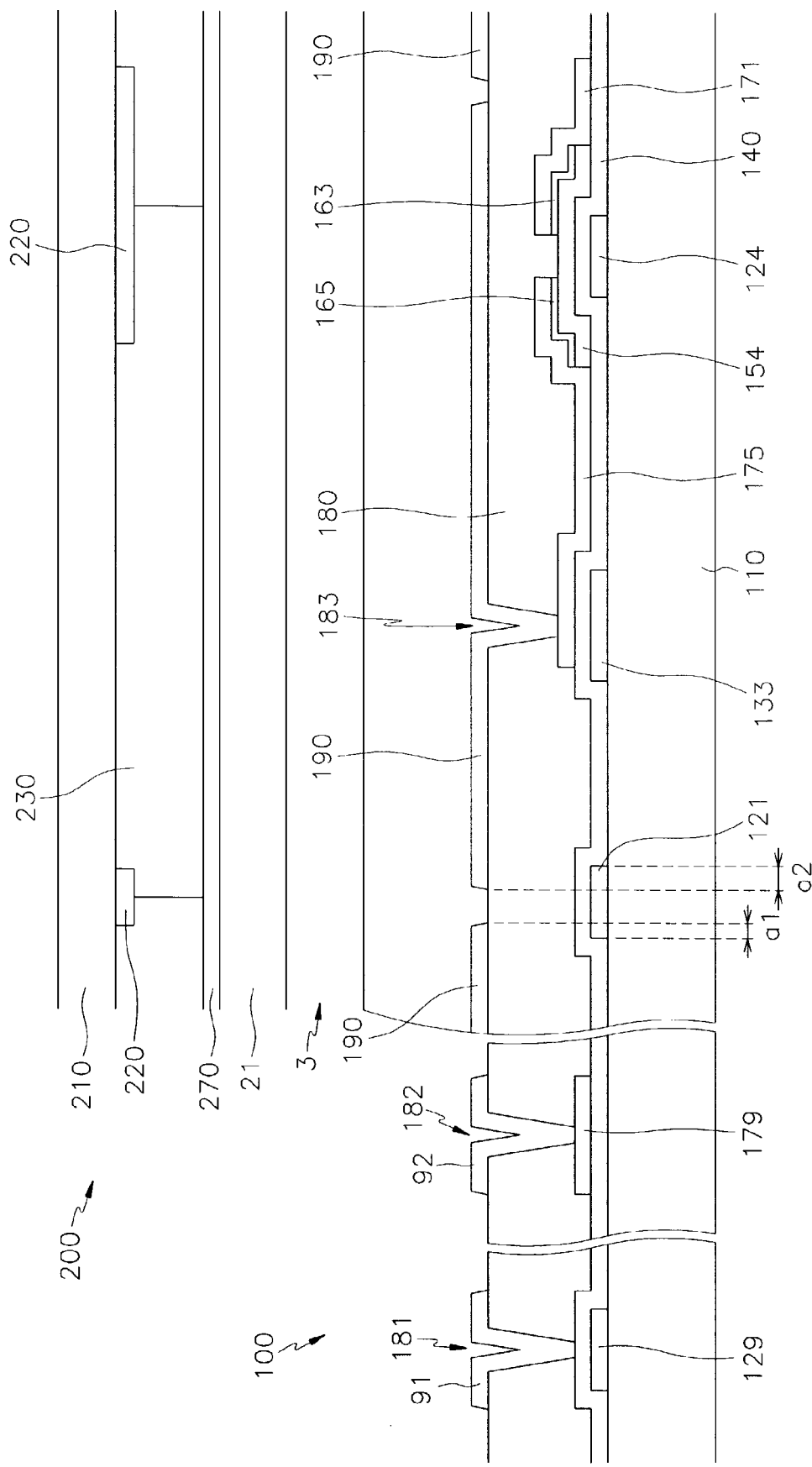
FIG. 2 is a sectional view of the TFT array panel shown in FIG. 1 taken along the line II–II'.

FIG. 1 is a layout view of an exemplary TFT array panel according to an embodiment of the present invention, and FIG. 2 is a sectional view of an exemplary LCD including the TFT array panel shown in FIG. 1 taken along the line II–II'.

As shown in FIG. 2, an LCD according to an embodiment of the present invention includes a lower panel ("TFT array panel") 100, an upper panel ("color filter panel") 200 and a liquid crystal layer 3 interposed therebetween.

The color filter panel 200 includes an insulating substrate 210, a black matrix 220, a plurality of color filters 230 and a reference electrode 270 formed in sequence. In addition, an alignment layer 21 is provided on the reference electrode 270.

As shown in FIGS. 1 and 2, the TFT array panel 100 includes a plurality of gate lines 121 and a plurality of storage electrode lines 131 extending substantially in a transverse direction formed on an insulating substrate 110. The gate lines 121 and the storage electrode lines 131 include either a single layer preferably made of material with low resistivity such as silver, silver alloy, aluminum and aluminum alloy, or multiple layers including such a single layer and a layer preferably made of material with good physical and electrical contact characteristics such as Cr, Ti and Ta. A plurality of branches of each gate line 121 form gate electrodes 124 of TFTs, and portions of storage electrode lines 131 expand upward and downward to form storage electrodes 133. A predetermined voltage such as a reference voltage or a common electrode voltage (referred to as "a common voltage" hereinafter) is applied to the storage electrode lines 131 from an external source. The common voltage is also applied to the reference electrode 270 of the color filter panel 200.

The gate lines 121 and the storage electrode lines 131 are covered by a gate insulating layer 140 preferably made of silicon nitride.

A plurality of semiconductor islands 154 preferably made of polysilicon or hydrogenated amorphous silicon are formed on the gate insulating layer 140 opposite the gate electrodes 124, and a plurality of pairs of ohmic contacts 163 and 165 preferably made of silicide or n+ hydrogenated amorphous silicon heavily doped with n type impurity are formed on the semiconductor islands 154. One of each pair of ohmic contacts 163 and 165 is separated from and disposed opposite to the other of the pair with respect to a corresponding one of the gate electrodes 124.

A plurality of data lines 171 and a plurality of drain electrodes 175 of the TFTs are formed on the ohmic contacts 163 and 165 and the gate insulating layer 140. The data lines 171 and the drain electrodes 175 preferably include Cr, Mo, Mo alloy, Al, Al alloy, Ta and Ti, and may have a double-layered structure including a low-resistivity metal layer and a good-contact metal layer exhibiting good contact characteristic with another material such as IZO (indium zinc oxide). Examples of the double-layered structure are an Al (or Al alloy) layer and a Cr layer; and an Al (or Al alloy) layer and a Mo (or Mo alloy) layer.

The data lines 171 extend substantially in a longitudinal direction and intersect the gate lines 121, and a plurality of branches of each data line 171 form source electrodes 173 of the TFTs. Each source electrode extending to one 163 of the corresponding pair of the ohmic contacts 163 and 165 is separated from and opposite the corresponding one of the drain electrodes 175, which is located at least in part on the other 165 of the pair of the ohmic contacts 163 and 165 with respect to corresponding one of the gate electrodes 124. The drain electrodes 175 extend onto the storage electrodes 133 to overlap.

The ohmic contacts 163 and 165 interposed between the semiconductor islands 154 and the data lines 171 and the drain electrodes 175 reduce the contact resistance therebetween.

A passivation layer 180 preferably made of silicon nitride, silicon oxide, low-permittivity insulating material such as SiO:C and SiO:F obtained by chemical vapor deposition or low-permittivity organic insulating material is formed on the data lines 171 and portions of the semiconductor islands 154, which are not covered by the data lines 171 and the drain electrodes 175.

The passivation layer 180 has a plurality of contact holes 182 and 183 exposing end portions 179 of the data lines 171 and the drain electrodes 175, and the passivation layer 180 and the gate insulating layer 140 has a plurality of contact holes 181 exposing end portions 129 of the gate lines 121. Contact holes 181 and 182 are provided for electrical connection between the signal lines 121 and 171 and respective driving circuits therefor.

A plurality of pixel electrodes 190 preferably made of transparent conductive material such as indium zinc oxide ("IZO") and indium tin oxide ("ITO") are formed on the passivation layer 180. Each pixel electrode 190 is electrically connected to respective one of the drain electrodes 175 through the corresponding contact hole 183.

Each pixel electrode 190 applied with voltages from the data lines 171 generate electric fields in cooperation with a corresponding reference electrode provided on the other panel, and the variation of the applied voltage changes the orientations of liquid crystal molecules in a liquid crystal layer between the two field-generating electrodes, the pixel electrode 190 and the reference electrode. In view of electrical circuits, each pair of the pixel electrode 190 and the reference electrode form a capacitor with liquid crystal dielectric for storing electrical charges. The storage capacitance due to the overlap of the drain electrodes 175 and the storage electrodes 133 enhances the charge storing capacity of the liquid crystal capacitors.

Furthermore, a plurality of contact assistants 91 and 92 preferably made of the same material as the pixel electrodes 190 are formed on the passivation layer 180. The contact assistants 91 and 92 are connected to the exposed end portions 129 and 179 of the gate and the data lines 121 and 171 through the contact holes 181 and 182, respectively. One skilled in the art can readily appreciate that the contact assistants 91 and 92 are not required but are preferred elements used to protect the exposed portions 129 and 179 of the gate and the data lines 121 and 171, respectively, and to complement the adhesiveness of the TFT array panel and the driving circuits.

An alignment layer 11 is formed on the TFT array panel 100. As indicated by an arrow in FIG. 1, the alignment layer 21 is rubbed obliquely, preferably, about a direction from the upper left corner to the lower right corner of the TFT array panel 100 or the pixel electrodes 190.

As shown in FIG. 1, the pixel electrodes 190 overlap the gate lines 121 and the data lines 171 to increase aperture ratio, and it is preferably adapted for low-permittivity passivation. The pixel electrode 190 is substantially rectangular in shape with two major edges substantially parallel to the gate lines 121 and the other two edges substantially parallel to the data lines 171. The upper one of the two gate-parallel edges has an expansion 191 located near the upper left corner of the pixel electrode 190 to increase the width of the corresponding overlapping area between the pixel electrode 190 and the gate line 121 and/or the data line 171. In addition, the left one of the two data-parallel edges of the pixel electrode proceeds into the data line 171 more deeply than the right one to increase the width of the left overlapping area.

The orientation of the liquid crystal molecules in the liquid crystal layer 3 near the rubbing-starting corner of the pixel electrode 190 is distorted since the tilt direction of the liquid crystal molecules due to the rubbing makes a large angle with the field direction of the fringe field due to the discontinuity of the pixel electrode 190. Since the overlapping area between the pixel electrode 190 and the signal lines 121 and 171 is light-blocked by the signal lines 121 and 171, the increased overlapping area near the rubbing-starting corner means that the distorted area (or the disclination area) is sufficiently blocked by the signal lines 121 and 171.

A TFT array panel for an LCD according to another embodiment of the present invention will be described in detail with reference to FIGS. 3–5.

Figure 3:
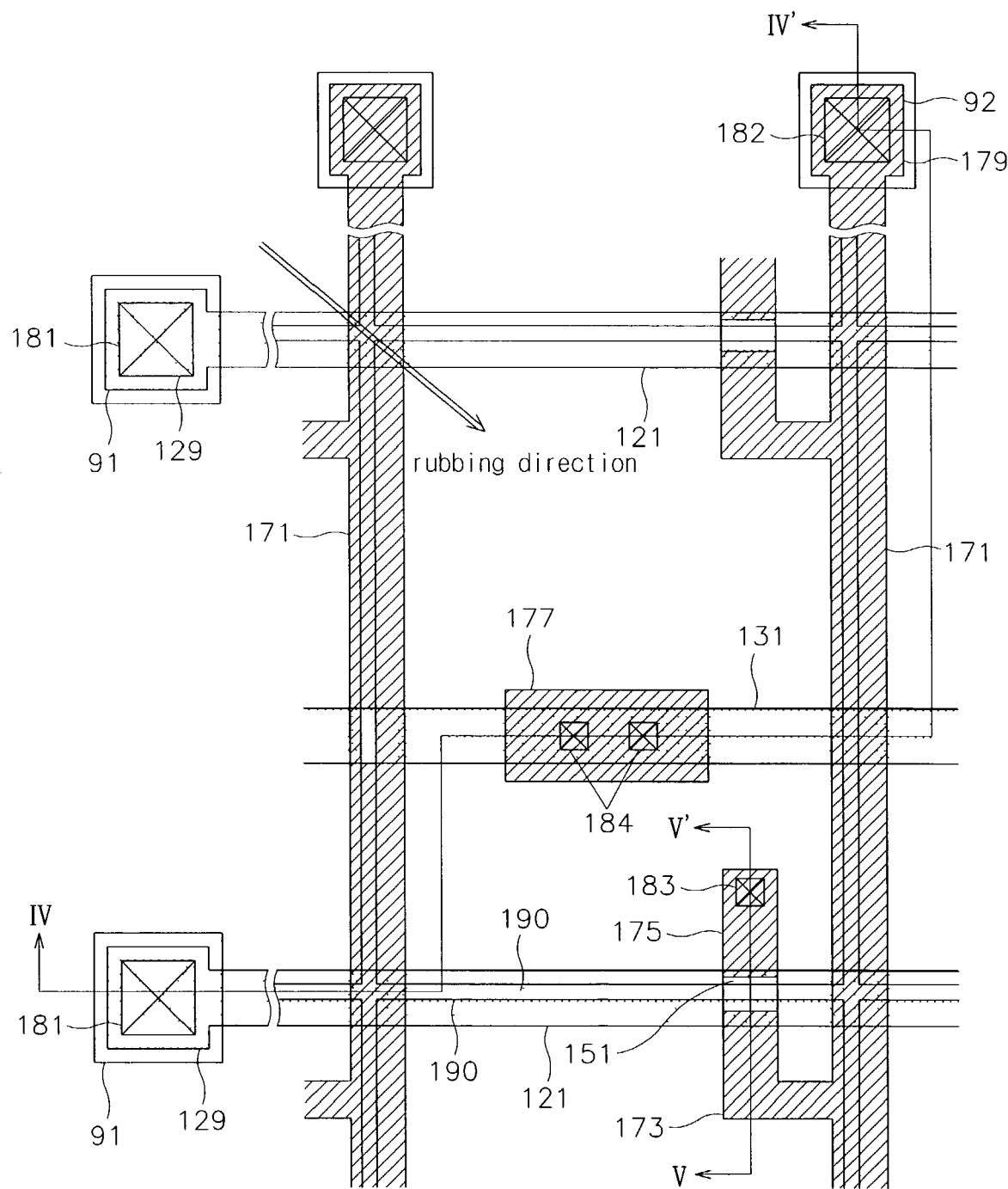
FIG. 3 is a layout view of an exemplary TFT array panel for an LCD according to another embodiment of the present invention.
Figure 4:
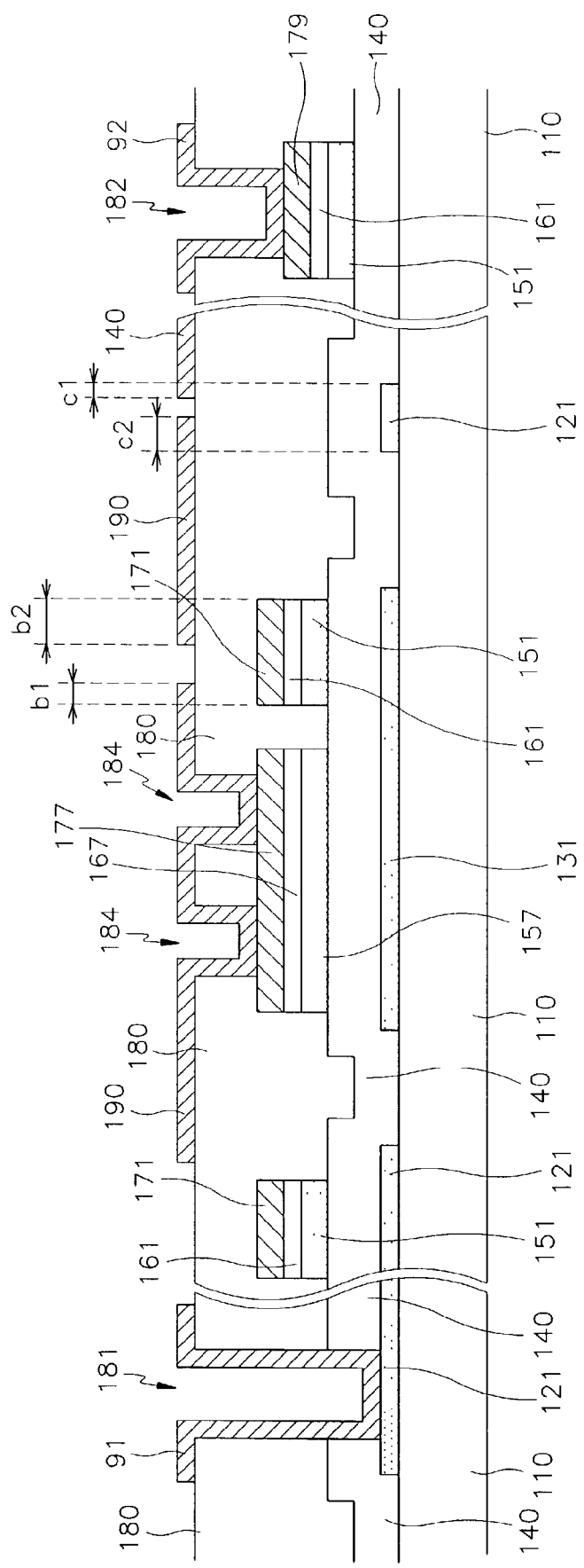
FIGS. 4 and 5 are sectional views of the TFT array panel shown in FIG. 3 taken along the lines IV–IV' and V–V', respectively.
Figure 5:
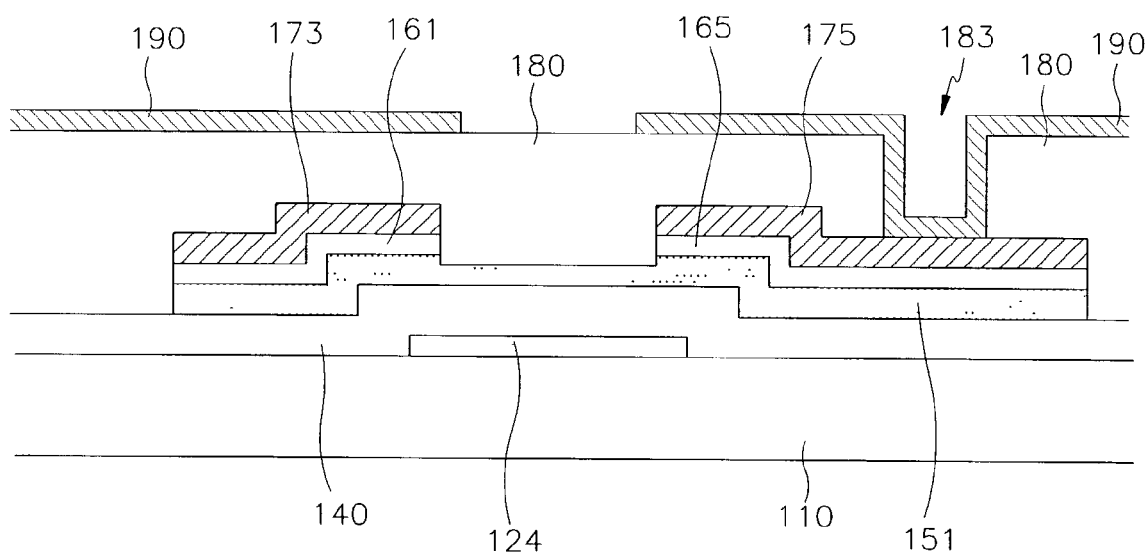

FIG. 3 is a layout view of an exemplary TFT array panel for an LCD according to another embodiment of the present invention, and FIGS. 4 and 5 are sectional views of the TFT array panel shown in FIG. 3 taken along the lines IV–VI' and V–V', respectively.

As shown in FIGS. 3–5, a TFT array panel of an LCD according to this embodiment is almost the same as that of an LCD shown in FIGS. 1 and 2.

Different from the TFT array panel shown in FIGS. 1 and 2, a plurality of pixel electrodes 190 have no expansion for increasing the corresponding overlapping area. Instead, the upper one of two gate-parallel edges of the pixel electrode 190 proceeds into the gate line 121 more deeply than the lower one to increase the width of the upper overlapping area.

Furthermore, a plurality of storage conductors 177 overlapping a plurality of storage electrode lines 131 are spaced apart from a plurality of drain electrodes 175. A plurality of contact holes 184 for exposing the storage conductors 177 are also provided to electrically connect the storage conductors 177 to the appropriate pixel electrodes 190.

In addition, a plurality of gate electrodes 124 of TFTs are parts of respective gate lines 121 rather than their branches.

Furthermore, there are provided a plurality of semiconductor stripes and islands 151 and 157 under respective plurality of data lines 171, a plurality of drain electrodes 175 and the storage conductors 177. Each semiconductor stripe 151 extends onto the gate electrodes 124 along a plurality of source electrodes 173 and a plurality of drain electrodes 175 to form channels of the TFTs. A plurality of ohmic contacts 161, 165 and 167 are provided between the semiconductor stripes and islands 151 and 157 and the data lines 171, the drain electrodes 175 and the storage conductors 177.

The semiconductor stripes 151 have similar planar shapes as the data lines 171 and the drain electrodes 175 except for channels of the TFTs. For example, although the data lines 171 are disconnected from the drain electrodes 175 on the channels of the TFTs, the semiconductor stripes 151 run continuously to form channels of the TFTs. The semiconductor islands 157 have similar planar shapes as the storage conductors 177. The ohmic contacts 161, 165 and 167 have similar planar shapes as the data lines 171, the drain electrodes 175 and the storage conductors 177.

While the present invention has been described in detail with reference to the preferred embodiments, those skilled in the art will appreciate that various modifications and substitutions can be made thereto without departing from the spirit and scope of the present invention as set forth in the appended claims.

What is claimed is:

1. A thin film transistor array panel for a liquid crystal display, comprising:
   a substrate;
   a plurality of signal lines including a gate line and a data line insulated from each other, the plurality of signal lines being provided on the substrate;
   a switching element electrically connected to the gate line and the data line;
   a pixel electrode electrically connected to the switching element and overlapping at least one of the signal lines to form at least one overlapping area, wherein the pixel electrode includes an expansion positioned at a corner thereof, the expansion forming a portion of the at least one overlapping area, wherein the portion of the at least one overlapping area including the expansion proceeds more deeply over the at least one signal line than the remaining portion of the at least one overlapping area, and a depth of the expansion over the at least one signal line is such that the expansion does not cover an entire width of the at least one signal line;
   an alignment layer covering the pixel electrode, wherein the expansion is disposed proximal to a starting position of a rubbing action of the alignment layer; and
   a storage electrode provided on the substrate, wherein the storage electrode overlaps the pixel electrode for forming a storage capacitance with the pixel electrode.

2. The thin film transistor array panel of claim 1, wherein the alignment layer is positioned for receiving the rubbing action in a predetermined direction.

3. The thin film transistor array panel of claim 1, wherein the portion of the at least one overlapping area including the expansion proceeds more deeply over the gate line than the remaining portion.

4. The thin film transistor array panel of claim 1, wherein the switching element comprises a semiconductor layer electrically connected to the pixel electrode, and the semiconductor layer extends along the gate line.

5. The thin film transistor array panel of claim 4, wherein the switching element further comprises an ohmic contact interposed between the semiconductor layer and the data line.

6. The thin film transistor array panel of claim 1, wherein the pixel electrode is located on an insulator and the thin film transistor is located under the insulator.

7. The thin film transistor array panel of claim 1, further comprising at least one drain electrode formed at least in part over at least part of the storage electrode.

8. The thin film transistor array panel of claim 1, wherein the at least one signal line is the gate line and an adjacent pixel electrode overlaps the gate line opposite the expansion.

9. A process for making a thin film array panel for a liquid crystal display, comprising:

forming a plurality of signal lines including a gate line and a data line on a substrate;

positioning a switching element to electronically connect to the gate line and the data line;

positioning a pixel electrode to overlap at least one of the signal lines to form at least one overlapping area, wherein the pixel electrode includes an expansion positioned at a corner thereof, the expansion forming a portion of the at least one overlapping area, wherein the portion of the at least one overlapping area including the expansion proceeds more deeply over the at least one signal line than the remaining portion of the at least one overlapping area, and a depth of the expansion over the at least one signal line is such that the expansion does not cover an entire width of the at least one signal line;

positioning an alignment layer to cover the pixel electrode;

positioning an alignment layer having a starting point for receiving a rubbing process for orienting liquid crystals, wherein the expansion is disposed proximal to the starting point of the rubbing process; and providing a storage electrode on the substrate, wherein the storage electrodes overlaps the pixel electrode for forming a storage capacitance with the pixel electrode.

10. The thin film transistor array panel of claim 1, further comprising:

a passivation layer formed over the at least one drain electrode and under the pixel electrode, the passivation layer including at least one contact hole for exposing a portion of the at least one drain electrode, wherein the pixel electrode is electrically connected to the at least one drain electrode through the at least one contact hole.

11. The process of claim 9, further comprising forming at least part of at least one drain electrode over at least part of the storage electrode.

12. The process of claim 9, wherein the at least one signal line is the gate line and the process further comprises positioning an adjacent pixel electrode to overlap the gate line opposite the expansion.

* * * * *